UNITED STATES PATENT OFFICE.

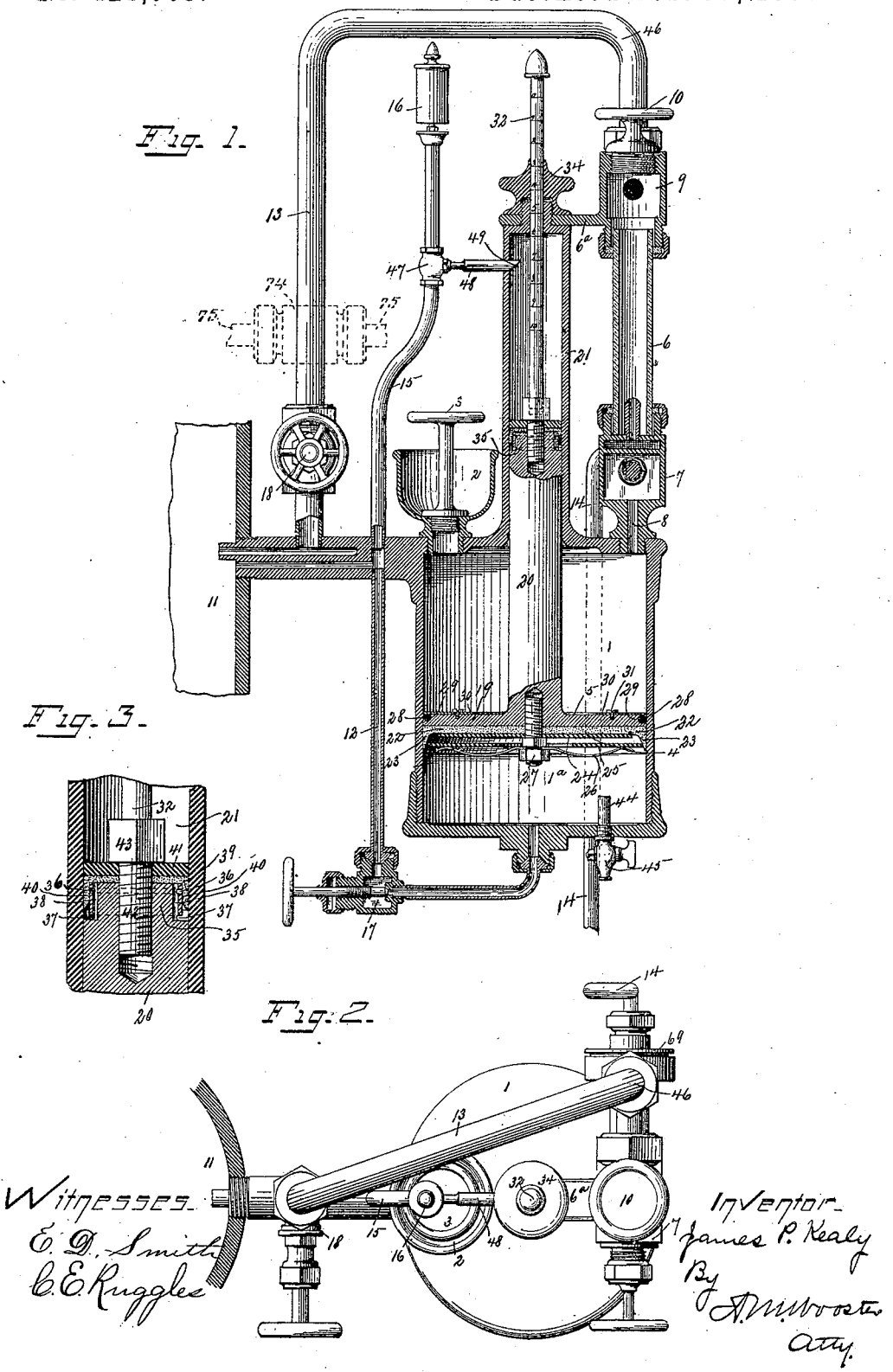

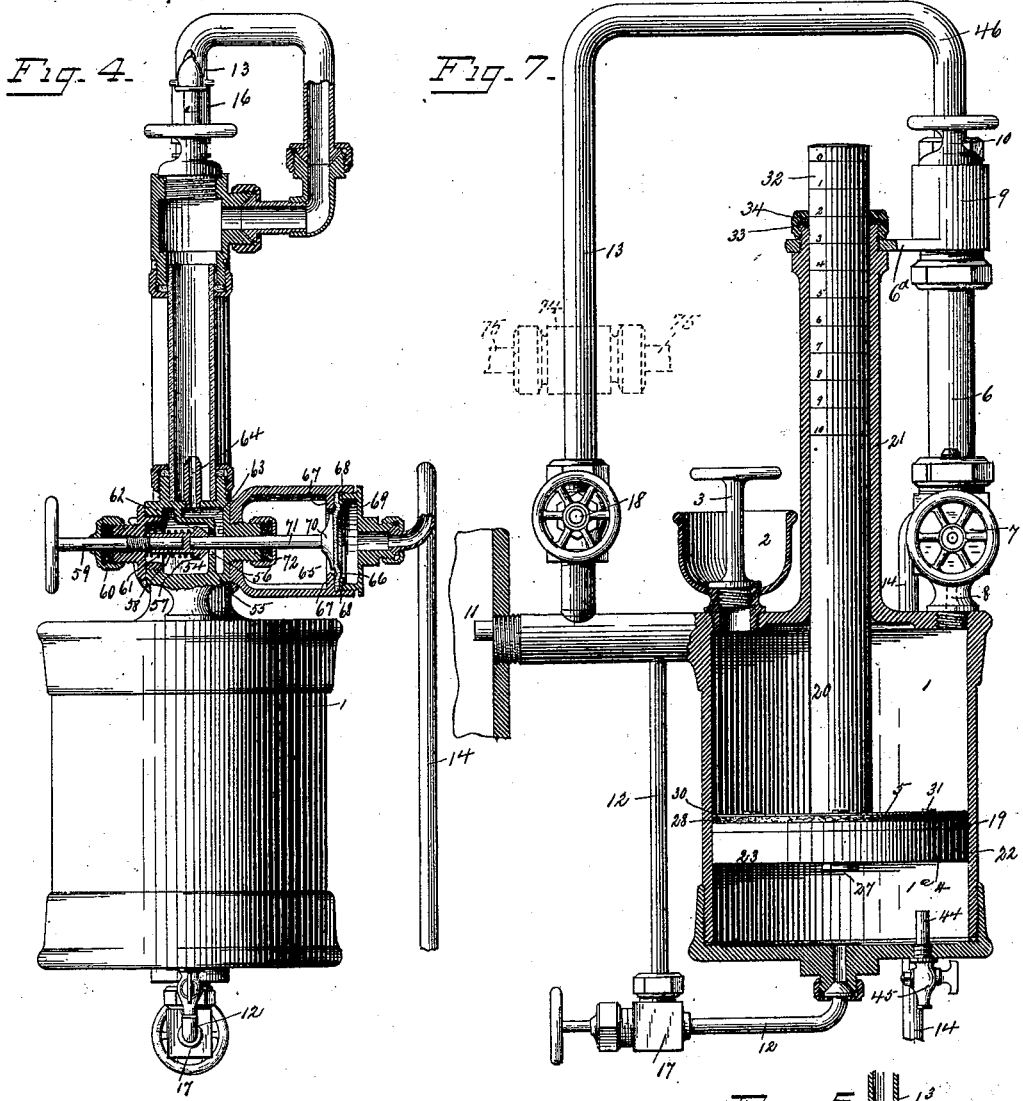

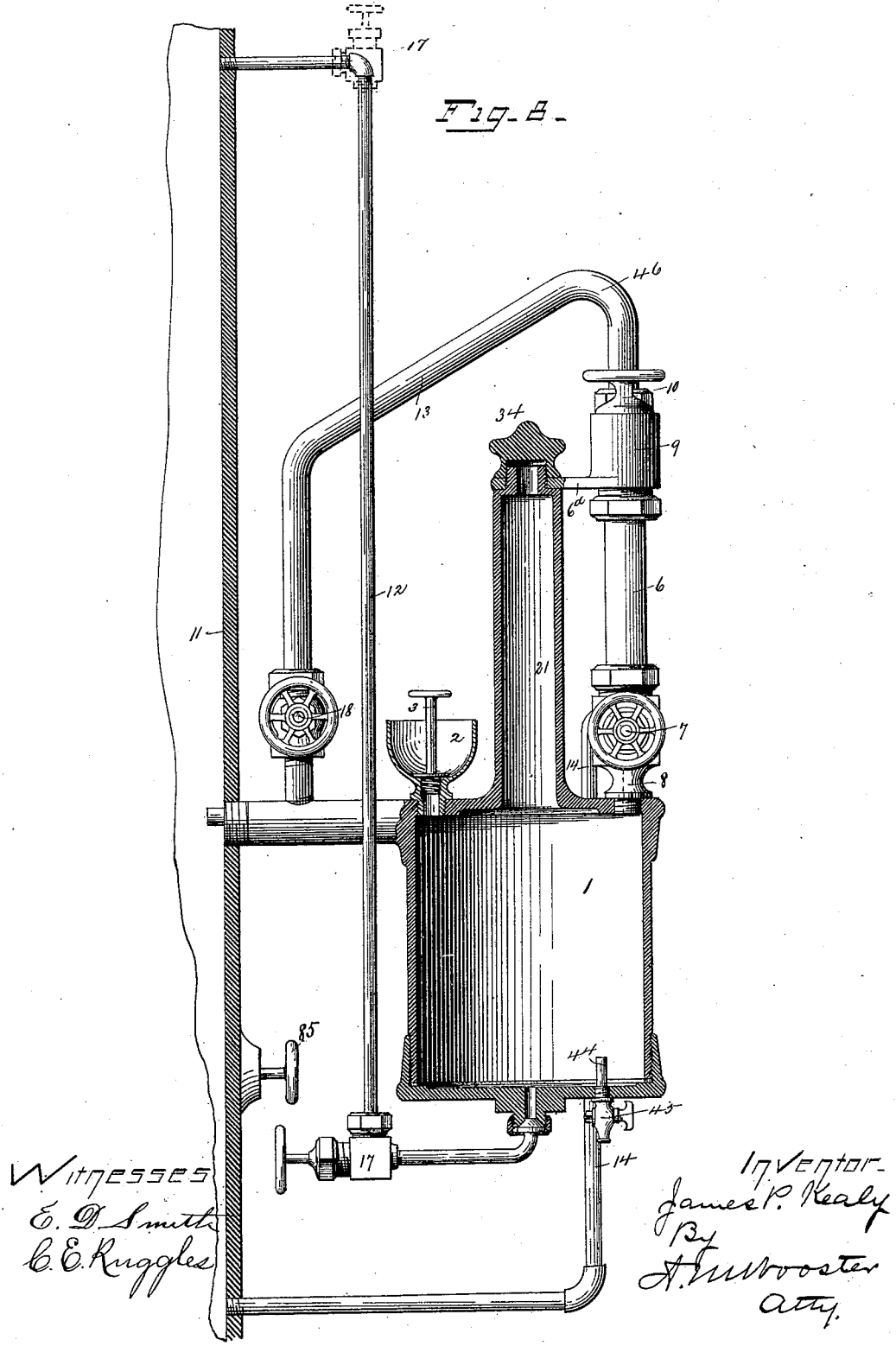

JAMES P. KEALY, OF NEW HAVEN, CONNECTICUT.

AUTOMATIC PRESSURE LUBRICATOR.

SPECIFICATION forming part of Letters Patent No. 421,003, dated February 11, 1890.

Application filed May 23, 1887. Serial No. 239,042. (No model.)

*To all whom it may concern:*

Be it known that I, JAMES P. KEALY, a citizen of the United States, residing at New Haven, in the county of New Haven and State of Connecticut, have invented certain new and useful Improvements in Automatic Pressure Lubricators; and I do hereby declare the following to be a full, clear, and exact description of the invention, such as will enable others skilled in the art to which it appertains to make and use the same.

My invention relates to the class of lubricators adapted for use upon steam-engines, and has for its object to produce a device of this class which will lubricate two cylinders at the same time, thus rendering duplication unnecessary, which will be entirely automatic in its operation, will require no further care other than to see that sufficient lubricant remains in the reservoir in which the observing-glass is always clear, and in which an alarm is given when the lubricant becomes nearly exhausted. With these ends in view I have devised the simple and novel construction of which the following description, in connection with the accompanying drawings, is a specification, similar numbers being used in all the figures to designate the same parts.

Figure 1 is a vertical section illustrating my invention as applied to a piston-lubricator, the arrangement for lubricating two cylinders being indicated in dotted lines; Fig. 2, a plan view corresponding with Fig. 1; Fig. 3, a detail sectional view illustrating the construction of the packing at the upper end of the stem; Fig. 4, a side elevation, the point of view being from the right in Fig. 1, the observing-glass and feed-valve being in section; Fig. 5, a detail sectional view illustrating my novel separator for dividing each drop of oil when it is desired to have a single device lubricate two cylinders; Fig. 6, a sectional view illustrating a modification in the mode of operating the feed-valve; Fig. 7, a vertical section corresponding with Fig. 1, illustrating a modified form of piston-lubricator; and Fig. 8 is a sectional view corresponding with Fig. 1, in which no piston is shown, the device being used as a condensing-lubricator, my novel separator and feed-valve being applicable to this style of lubricators as well as to differential piston-lubricators.

It is of course well understood by those familiar with steam-engines that as the steam-pressure increases the friction also increases, the steam acting to force the packing-rings and valves against their corresponding contact-surfaces, and as the steam-pressure diminishes the friction also diminishes, so that the amount of lubricant actually required varies proportionately to the pressure. If the supply of lubricant is insufficient, the wear of the parts is greatly increased, and, on the other hand, all lubricant that is supplied to the working parts beyond a certain required amount is wasted.

In my improved lubricator I have so constructed and organized the parts that when the device has once been put in operation and regulated its operation will be entirely automatic, the supply of lubricant will be ample without waste, the supply will commence the instant that it is wanted and cease the instant it is no longer required, and the quantity of lubricant supplied during the operation of the parts will be regulated entirely by the force of steam-pressure.

I will first describe my invention as applied to a piston-lubricator.

1 denotes the reservoir for the lubricant, which is supplied through filling-cup 2, closed by screw-plug 3, and 1$^a$ the steam-space below the lubricant.

4 denotes the larger or steam piston, and 5 the smaller or lubricant piston. These two pistons are in practice combined in one, as clearly shown in Figs. 1 and 7.

6 denotes the observing-glass supported by brackets 6$^a$; 7, the feed-valve, which is located below the observing-glass, and 8 a passage from the lubricant-reservoir to the feed-valve.

The details of construction of the feed-valve will presently be more fully explained.

The observing-glass is filled with water or other fluid through cap 9, which is closed by screw-plug 10.

It will of course be understood that my novel lubricator is adapted for use upon all classes of engines, and may be placed upon the engine itself or in any position adjacent thereto, the only conditions necessary being to make connections with the steam-pipes leading to the parts to be lubricated.

11 denotes the main steam-pipe; 12, a steam-pipe leading therefrom to the reservoir; 13, a steam-pipe leading from the main steam-pipe to the observing-glass and thence to the reservoir above the lubricant; 14, a steam-pipe leading from the main steam-pipe to the feed-valve; and 15, a steam-pipe leading either directly or indirectly from the main steam-pipe to a whistle 16 or other equivalent alarm—as, for example, a gong—which it is not deemed necessary to illustrate.

17 denotes a valve of any ordinary or preferred construction in pipe 12 leading to the reservoir, and 18 a valve of any preferred construction in pipe 13 leading to the observing-glass and thence to the reservoir above the lubricant.

As already stated in Figs. 1 and 7, pistons 4 and 5 are combined in one—that is to say, the desired result is accomplished by differential pressure upon opposite sides of what is really a single piston. As it is packed, however, upon both ends, and, in fact, performs the double function of steam-piston and lubricant-piston, I shall speak of the side having the greater area as piston 4 or the steam-piston, and the side having the smaller area as piston 5 or the lubricant-piston.

19 is a metallic disk adapted to move closely in the reservoir, the lower portion of which (indicated by 1ª) I term in this instance the "steam-space." Disk 19 is made integral with or is secured to a stem 20.

21 is a tube extending upward from the reservoir, into which stem 20 passes.

Piston 4 consists of a disk 22, ordinarily of rubber, which is provided with a circular lip 23, adapted to press closely against the interior of the steam-space.

24 is a metallic disk by which the body of disk 22 is held in position; 25, a metallic disk or ring by which the lip is held against the interior of the steam-space; 26, a spring-bearing upon disk 25, and 27 a set-screw passing through said disks and engaging disk 19, by which the several parts composing piston 4 are held in place.

Piston 5 consists of a packing disk or ring 28, let into a groove 29 in disk 19, and a metallic disk or ring 30, by which it is held in place, the latter being secured to disk 19 by set-screws 31.

32 is a tell-tale at the upper end of stem 20, which extends through the upper end of tube 21, and is graduated in any suitable manner to indicate the quantity of lubricant that has been forced out from the reservoir or that remains within it or the consumption of lubricant per hour.

It will be clearly understood from what has been said that steam-pressure through pipe 12 acts upon piston 4 in one direction and steam-pressure through pipe 13 and the observing-glass acts upon the lubricant above piston 5 in the opposite direction. It will be apparent, therefore, that in order to force lubricant out from the reservoir the area of the steam-piston must be greater than that of the lubricant-piston. In the form shown in Figs. 1 and 7 the area of the lubricant-piston is reduced by stem 20. In the form illustrated in Fig. 7 suitable packing is placed at the upper end of the tube and held in place by cap 34. In the form illustrated in Fig. 1 the tell-tale is made independent of stem 20 and secured thereto. Cap 34 is not packed, but a packing is provided at the upper end of the stem. In this form the upper end of the stem is reduced, as at 35, being provided with an upper groove 36 and lower groove 37 and one or more holes 38, drilled from the end of the stem and intersecting both grooves.

39 is a packing-disk, ordinarily of rubber, having a downwardly-projecting lip 40, and 41 a metallic disk held in place by a screw 42, which passes through said disks and engages the stem.

43 is a nut, which engages the top of screw 42 and into the opposite side of which the tell-tale is screwed. It will of course be apparent that, as there is no packing below the upper end of the stem, more or less lubricant will pass up outside the stem and into grooves 36 and 37, the action of the lubricant in these grooves being to expand the lip against the interior of the tube, forming an absolutely-tight packing. It will furthermore be apparent that in this form the area of piston 5 is greater than in the form illustrated in Fig. 7. In the latter form the area of piston 5 is equal to the area of piston 4 minus the area of stem 20, while in Fig. 1 the area of piston 5 is equal to the area of piston 4 less the diameter of the stem at reduced portion 35, it being apparent that the pressure of the lubricant upon the shoulder in the stem below the reduced portion will be the same as upon the main portion of piston 5.

I have not specified any definite relative areas for the steam and lubricant pistons, that not being of the essence of my invention, and being a matter, moreover, that may be greatly varied to suit the views of the manufacturer or the special uses for which lubricators are intended. It is deemed sufficient for the purposes of this application to illustrate steam-pistons having greater area than the lubricant-pistons.

The operation of the forms of piston-lubricator is as follows: In starting, the pistons are down to give all the space possible for lubricant. In Figs. 1 and 7 I have shown an escape-pipe 44, provided with a petcock 45, which leads from the steam-space to draw off the water of condensation. The pistons may be lowered until they rest upon this pipe, which is long enough to retain sufficient water in the steam-space to prevent the packings from becoming overheated. The reservoir is filled with oil or whatever lubricant is to be used through filling-cup 2, and the observing-glass is filled with water or other fluid through cap 9. The device is then ready for operation upon opening valves 17 and 18 in steam-pipes 12 and 13. As the area of the steam-piston is greater than the area of the lubricant-piston, it follows that the latter will be raised slowly, owing the excess of pressure. This will force the lubricant out slowly, drop by drop, into and through the observing-glass, and thence into steam-pipe 13, by which it is carried into the main steam-pipe and passes to the parts to be lubricated. Steam-pipe 13 may be made of any shape—for example, as in Fig. 1 or as in Fig. 8. As soon as the lubricant has reached bend 46 it passes at once down into the main steam-pipe. It will of course be apparent that the portion of pipe 13 between the observing-glass and bend 46 will become filled with water of condensation. This, however, passes off into the main steam-pipe as quickly as formed whenever it reaches bend 46.

In order that the engineer or other person in charge may know the exact quantity of lubricant in the reservoir or that is being consumed per hour, he has merely to watch the tell-tale. In order, however, to avoid the possibility of the lubricant in the reservoir becoming entirely exhausted, I have provided an alarm, which may be engaged by the tell-tale, stem, or by the piston itself when it has reached a certain point in its upward movement. In the present instance I have shown a whistle, although a gong might be used, if preferred.

Steam is supplied to sound the whistle through pipe 15. 47 is a valve in this pipe, which cuts off the steam when it is not wanted. This valve may be of any suitable or preferred construction, that not being of the essence of my invention. In the present instance I have shown it as operated by means of a slide 48, the beveled end 49 of which passes into tube 21, and is engaged by disk 41 when the lubricant-piston has been raised nearly to the top of the reservoir and the lubricant is nearly exhausted. The instant disk 41 comes in contact with the beveled end of the slide the latter is forced inward, which quickly operates the valve and allows steam to pass to the whistle, which sounds a continuous alarm until the reservoir is replenished with lubricant.

In all of the forms it will be apparent that the amount of lubricant forced out from the reservoir will vary with the steam-pressure. As the pressure increases, the amount of lubricant forced out also increases, thus meeting the requirements in overcoming the increased friction of the operative parts caused by increase of pressure. As the pressure diminishes, the amount of lubricant forced out is also diminished, thus preventing waste in use.

Turning now to Figs. 1, 2, 4, and 7, I will explain an important feature of my invention—to wit, my automatic feed-valve, which is designated in its entirety by 7.

As already stated, 8 denotes the passage leading from the lubricant-reservoir to this valve. This passage leads into chamber 54 within the valve, the forward wall 55 of which is provided with an opening 56, which is ground or packed in any suitable manner to form a perfectly-tight seat for valve-disk 57.

58 is a shank extending backward from the valve-disk, which is provided with a central opening to receive the inner end of a stem 59. This stem is provided with a screw-thread, which engages cap 60 of the valve-case or any other suitable portion thereof.

61 is a spring surrounding the shank, which bears against the inner side of cap 60 and against shoulder 62 upon the disk, the normal action of this spring being to hold the disk against the seat.

Opening 56 in wall 55 leads into a passage 63, by which lubricant that passes the valve is conducted to the observing-glass. I preferably provide a tube 64, into which this passage leads, and which conducts the lubricant a short distance above the bottom of the observing-glass, as clearly shown in Figs. 1, 4, and 6. The upper end of this tube is reduced in thickness to reduce the support for the oil drop in forming, small drops being preferable in use.

65 is an independent chamber directly forward of the valve and passage 63. Within this chamber is a steam-tight diaphragm 66, secured between shoulder 67 and flange 68 upon cap 69, or in any other suitable manner. This diaphragm is preferably made of rubber; but leather or thin metal may of course be substituted, if preferred.

70 is a disk resting against the diaphragm, and 71 a rod rigidly secured to the disk, which passes through packing 72 at the inner end of the chamber, across passage 63, through opening 56, and passes into an opening in the face of the valve-disk to insure its alignment.

Steam is admitted to chamber 65 outside of diaphragm 66, through steam-pipe 14, which connects with main steam-pipe 11 at any place between the throttle-valve 85 and the parts to be lubricated. The distance that valve-disk 57 can move backward away from its seat, and consequently the amount of lubricant that can be forced out by the steam-pressure, may be regulated by turning threaded stem 59 in or out. Having once adjusted this valve when the device is first placed in operation, its operation afterward is purely automatic. The instant that the throttle-valve is opened steam passes through pipe 14 into chamber 65, and acting against the diaphragm forces it inward and of course moves valve-disk 57 from its seat against the power of spring 61, allowing more or less lubricant to pass through into the observing-glass and out into pipe 13, thence to main steam-pipe 11, by which it is carried to the parts to be lubricated. The instant that steam is cut off at the throttle-valve the pressure against the diaphragm is removed, and spring 61 acts to force the valve-disk against its seat, thus cutting off the passage of lubricant and preventing waste when not in use.

In Fig. 6 I have illustrated a modification of the construction just described, in which a piston 73 is substituted for the elastic diaphragm and disks, as in the other form. I preferably use the form illustrated in Fig. 4; but the form in Fig. 6, or a ball, slide, or plug valve may be used, if preferred, the essential requirement being that the admission of steam to start the engine opens the valve controlling the flow of lubricant.

It should be understood that my novel automatic valve is equally well adapted for use in a condensing-lubricator, either in pipe 13 to control the escape of lubricant, or in pipe 12 to control the admission of steam to condense and drive the lubricant out, as shown in Fig. 8. In fact, a piston-lubricator may be readily transformed into a condensing-lubricator by simply removing the pistons, the tell-tale, and slide 48, placing a tight cap at the upper end of tube 21, and plugging the hole for the slide.

In Fig. 8 I have illustrated the device in use as a condensing-lubricator, slight changes in the arrangement of the steam-pipes being made, in order to show clearly that the arrangement of said pipes is not of the essence of my invention. When used as a condensing-lubricator, steam-pipe 12 is connected to the main steam-pipe at a point above the highest portion of steam-pipe 13. It is of course obvious that as soon as steam is admitted through pipes 12 and 13 it will condense both above and below the lubricant. As soon as the water of condensation has reached bend 46 in pipe 13, it must pass downward through said pipe and into the main steam-pipe. In pipe 12 it will condense until the highest portion of the pipe is reached. As the highest portion of pipe 12 is considerably above the highest portion of pipe 13, it follows that the weight of the water of condensation in pipe 12 is added to the steam-pressure, so that lubricant is forced out in the same manner as in the other form.

In building condensing-lubricators I have found it quite practicable to put the feed-valve (denoted by 7) in the position in which valve 17 is illustrated in Fig. 8, said figure being intended to illustrate a piston-lubricator transformed into a condensing-lubricator. When this change in the location of the feed-valve is made, the valve denoted by 17 is placed at the bend in pipe 12 (See dotted lines, Fig. 8, where a coupling is shown in full lines.) In other words, the feed-valve, which is shown as in the oil-pipe 13, may be placed in the steam-pipe 12, if preferred. This being obviously an equivalent construction, is not deemed to require illustration in an independent figure.

In Fig. 5 I have illustrated a novel separator or device for dividing the drops of oil when it is desired to use a single lubricator in connection with two cylinders. 74 denotes a coupling or joint of any suitable or preferred form. This coupling is placed at any portion of pipe 13 below its highest point—for example, as indicated in dotted lines in Figs. 1 and 7. Pipe 13 ends at the coupling when used, and pipes 75 lead therefrom to the cylinders or other parts to be lubricated.

The novel feature of my separator is a knife-edge 76, placed centrally within the clearing-space 78 within the coupling transversely to pipes 75, which are of course in line with each other. The knife-edge is secured in any suitable manner within the shell of the coupling, and extends upward to or slightly above an imaginary line at the center of pipes 75. The lower end of pipe 13 is contracted, as at 79, so that the oil will form in drops, and each drop of oil as it falls from said pipe will strike the knife-edge and be divided into two smaller drops or particles, which pass off in opposite directions by pipes 75 to the parts to be lubricated. It will of course be understood that this principle of subdivision may be still further carried out by putting other separators in pipes 75.

My novel separator and the automatic feed-valve both operate in connection with condensing-lubricators in precisely the same manner as with the other form.

Valves 17 and 18 are placed in pipes 12 and 13 for convenience when it is desired to cut off steam from the lubricator independently of the main steam-pipe, and are of course useful under certain circumstances. They are not, however, required in ordinary use, as when the lubricator has once been placed in operation the passage of lubricant from the reservoir is controlled entirely by the automatic feed-valve, which opens or closes the instant steam is let on or cut off at the throttle-valve of the engine.

It will of course be apparent that innumerable changes in the details of construction may be made without departing from the principle of my invention.

I claim—

1. The reservoir having tube 21, the steam-space, and steam-pipes leading to the reservoir and steam-space, in combination with pistons 4 and 5, made integral, the latter having a stem whereby its area is diminished, and a graduated tell-tale extending through the upper end of the tube, whereby the quantity of lubricant in the reservoir and the consumption per hour are indicated.

2. The reservoir, steam-space, and pipes 12 and 13, in combination with a packed lubricant-piston and a steam-piston of greater area made integral therewith, and consisting of a rubber disk with a depending lip, disk 24, engaging the rubber disk, disk 25, engaging the lip, and a spring and set-screw whereby the parts are held in place.

3. A reservoir, tube 21, a steam-space, pipes leading to said reservoir and steam-space, and steam and lubricant pistons, the latter having a stem extending into the tube, in combination with an alarm—for example, a whistle—a steam-pipe having a valve leading thereto, and a slide controlling said valve, the forward end of which is beveled and is adapted to be engaged by the upper end of the stem when the lubricant is nearly exhausted.

4. A reservoir, steam-space, pipe leading to the reservoir, and steam and lubricant pistons, the former being of greater area, in combination with a steam-pipe leading to the steam-space, and a steam-pipe 13, observing-glass, automatic valve, and passage 8, through which steam-pressure is exerted above the lubricant when the valve is opened.

5. The combination, with the reservoir, steam-space, and pistons of a differential piston-lubricator, of a steam-pipe leading to the steam-space, a steam-pipe leading to the reservoir above the lubricant, valve 7, and a steam-pipe leading to said valve, whereby the latter is automatically opened the instant steam is admitted to start the engine.

6. In a lubricator, the reservoir and steam-pipes 12 and 13, whereby steam is admitted above and below the lubricant, in combination with valve 7, chamber 65, having diaphragm 66, a rod extending from said diaphragm to the valve-disk, and a steam-pipe leading to said chamber through which steam-pressure acts to force the diaphragm inward to open the valve.

7. In a lubricator, the reservoir, chamber 54, passage 8, leading to said chamber, passage 63, and a valve-seat opening into said passage, in combination with an adjustable spring-actuated valve-disk, chamber 65, means, as a diaphragm in said chamber and a rod connecting said diaphragm with the valve-disk, whereby the inward movement of the diaphragm is caused to open the valve.

8. In a lubricator, the combination, with a reservoir and steam-pipes 12, 13, and 14, of a valve-seat opening into passage 63, an adjustable spring-actuated valve, chamber 65, means, as a diaphragm in said chamber, whereby the valve-disk is controlled, and a tube 64, by which lubricant is conducted from passage 63 into the body of the observing-glass.

9. The combination, with the reservoir of a lubricator, of steam-pipes 12, 13, and 14, chambers 54 and 65, a spring-actuated valve-disk in chamber 54, a diaphragm or its equivalent in chamber 65, and a rod connecting said disk and diaphragm, whereby the flow of lubricant from the reservoir to the observing-glass is caused to start or stop the instant steam is admitted to or cut off from said pipes.

10. The combination, with the reservoir of a lubricator and steam-pipes 12, 13, and 14, of a lubricant-piston, a steam-piston of greater area than the lubricant-piston, and an automatic valve, substantially as described, whereby the flow of lubricant from the reservoir is increased or diminished as the steam-pressure increases or diminishes, preventing waste in use, and the flow is instantly checked when steam is cut off, preventing waste when not in use.

11. The combination, with a reservoir, steam-pipes 12 and 13, and tube 21, of steam-piston 4 and lubricant-piston 5, having a stem extending upward into the tube, and an alarm, substantially as described, adapted to be operated by said stem when the lubricant is nearly exhausted in the reservoir.

12. The combination, with a reservoir for lubricant, a steam-space, a steam-pipe leading to the reservoir above the lubricant, and a steam-pipe leading to the steam-space, of a piston adapted to act against the lubricant, a piston of greater area adapted to be acted upon by steam, and a separator, substantially as described, in the pipe leading to the reservoir, whereby the drops of lubricant are divided and the particles caused to pass off in opposite directions.

13. In a lubricator of the class described, an alarm-whistle having a valve and means, as a slide, adapted to be operated by the movement of the piston, whereby the alarm is sounded at the near approach of the exhaustion of the lubricant.

14. In a lubricator, the stem 20, provided with circular grooves 36 and 37, longitudinal holes 38, intersecting said circular grooves, whereby the packing is kept tight.

15. The combination, with the reservoir of a steam-pipe 14 and chambers 54 and 65, of a spring-actuated valve in chamber 54, a diaphragm in chamber 65, and a rod connecting the valve-disk and said diaphragm, whereby the flow of lubricant from the reservoir is caused to start or stop the instant steam is admitted or cut off in said pipe.

16. An automatic regulating-valve for lubricators having a chamber 54, passages 8 and 63, leading to said chamber, a valve-disk in said chamber, a spring holding said disk at the closed position, and a screw-stem 59, whereby a fixed opening is established between passages 8 and 63, in combination with a chamber 65, a diaphragm in said chamber, a stem connecting the diaphragm and valve-disk, and pipe 14, leading to chamber 65, whereby steam-pressure through the medium of the diaphragm and stem acts to move the valve-disk against screw-stem 59, as and for the purpose set forth.

17. In a lubricator, pipes 13 and 14 and chambers 54 and 65, in combination with diaphragm 66, a disk 70, having stem 71, valve-disk 57, having stem 59 and spring 61, as and for the purpose set forth.

In testimony whereof I affix my signature in presence of two witnesses.

JAMES P. KEALY.

Witnesses:
A. M. WOOSTER,
C. E. RUGGLES.